United States Patent Office 3,484,371
Patented Dec. 16, 1969

3,484,371
PROCESS FOR THE PRODUCTION OF HYDRO-
PHOBIC PARTICULATE MATERIALS FROM
WATER GLASS
Hanns Biegler, Wesseling Bezirk, Cologne, Gottfried
Kallrath, Bruhl-Vochem, and Kurt Klein, Langen-
Oberlinden, Germany, assignors to Deutsche
Gold- und Silber-Scheideanstalt vormals Roessler,
Frankfurt am Main, Germany
No Drawing. Filed Dec. 12, 1966, Ser. No. 600,720
Claims priority, application Germany, Dec. 10, 1965,
D 48,890
Int. Cl. B01d 15/00
U.S. Cl. 210—40                                    9 Claims

ABSTRACT OF THE DISCLOSURE

Hydrophobized spray dried hollow water glass particles suitable for removal of oil pollutions from the surfaces of bodies of water are produced by hydrophobizing spray dried water glass particles with vapors of an organic halo silane, such as, dimethyl dichlorosilane, followed by a heat treatment at about 300° C. When sufficient halo silane to neutralize the water glass product completely is not used in hydrophobizing, the product is treated with mineral acid vapors for such neutralization. Hydrophobized product may be converted to granules with the aid of latex emulsions.

The present invention relates to an improved process for the production of hydrophobic particulate materials (fine grained powders or granulates) from water glass which are suited for taking up water insoluble substances, especially, oils, and particularly suited for removal of oil pollutions from bodies of water.

It is known that oil absorbing substances, primarily of natural origin, such as, for example, perlite, sawdust or peat, can be used to remove oil pollutions from harbors, rivers and similar bodies of water by application to the surfaces of the polluted waters. Attempts have also been made to use granulates, obtained from natural rubber latices, which have a good absorption capacity for oils for the removal of oil pollutions. The first mentioned materials, however, have the disadvantage than in view of their insufficient hydrophobic characteristics and wettability by the oil to be absorbed or because of premature sinking down in the water because of absorption of water do not effect complete removal of the oils. The latex granulate which is much more easy to distribute, for example, by spraying apparatus, than the other materials and also is marked by a high oil absorption capacity has the disadvantage of high cost so that large scale applications thereof in many instances are not practical.

As all finely divided substances with a hydrophobic surface are preferentially wetted by oil, there has been a changeover to the use of powdered materials of volcanic origin, which are suited as absorbents and have been rendered hydrophobic, to combat oil pollutions in bodies of water either alone or in combination with other usual materials. Nevertheless, such absorbents, as well as, those mentioned earlier still are subject to various disadvantages, such as, for example, the unfavorable spreading properties of powders because of high tendency for dusting, the sinking after absorption of the oil under the surface of the water which often occurs, especially with sawdust and peat, the insufficient absorption capacity so that the oil drips out of the agglomerates obtained, while being carried off because it is not held sufficiently firmly and finally insufficient combustability, during their necessary destruction, of the crumbly oil containing masses which have been skimmed off the water.

The rapid and complete elimination of oil pollutions has become a pressing problem in the often occurring accidents causing oil leakage so that there has been great demand for the development of new and less costly agents and processes for the elimination of oil pollutions.

It is an object of the present invention to provide a method for the production of hydrophobic fine grained powders or granulates which do not have the disadvantages mentioned above.

According to the invention it was found that this object could be achieved by employing spray dried water glass which is obtained from its aqueous solutions in the form of hollow spheres with an apparent bulk density of about 50 to about 200 g./liter and preferably about 60 to 100 g./liter which has been treated in a closed vessel while stirring with vapors or organic halo silanes and subsequently given a heat treatment. The resulting product is a highly active absorbent which is easy to produce and so inexpensive that it also can be used in large quantities when large expanses of oily water are concerned.

It was unexpectedly found that the thin walled hollow spherical products, obtained by spray drying from water glass solutions of certain density, can easily be rendered hydrophobic by simple treatment with vapors of organic halo silanes, such as, for example, dimethyl dichlorosilane, to provide products which have sufficiently large openings to permit oil absorption and to hold the absorbed oil firmly.

Finely divided, precipitated and hydrophobic silicas with large specific surface areas do not exhibit these properties after spray drying as they upon being spread on the surface of water form large and heavy agglomerates which sink to the bottom before they can develop their full absorbent activity. For this reason such hydrophobic silicas can only be used in combination with other absorbents. Such mixtures in view of their limited oil take up capacity cannot be used in instances in which total oil elimination is necessary.

The spray drying of the water glass, which is known, per se, is expediently effected by atomizing a usual commercial solution with, for example, a density of about 1.31 and a $Na_2O:SiO_2$ molar ratio of about 1:3 in a drying tower with the aid of a pressure nozzle. The apparent bulk density of the spray dried product can be varied by varying the temperature of the drying air introduced, the size of the bore of the nozzle and the atomizing pressure and, for example, can be adjusted to the advantageous bulk density of 60–70 g./liter which is suited for spreading over contaminated water surfaces without dust formation. When such spray dried product is given a sieve analysis, 90% thereof remains on sieves with mesh openings of 315–600μ. The grain size indicated is most advantageous for the hydrophobizing treatment as well as for the spreading properties of the resultant product on oil contaminated water surfaces. The quantity of organic halo silane employed for the hydrophobizing treatment is between about 2 and 20 wt. percent, preferably, about 3 to 5 wt. percent, with reference to the dry alkali metal silicate.

During the treatment of the spray dried product with the organic halo silanes the latter react with the silanol groups of the dried water glass with liberations of hydrogen halide which is absorbed by the alkali metal of the water glass with formation of the alkali metal halide, such as, NaCl. All of the alkali can be thus neutralized by the addition of about 20 wt. percent of the silane with reference to the dry alkali metal silicate. The hollow spheres of resulting product have good hydrophobic properties and consist of about ⅓ of alkali metal halide and about ⅔ of silica. The stability of the spheres can be improved still further by a tempering treatment at about 150 to 550° C. for about 1 to 120 minutes, preferably, at about 300° C. for about 30 minutes. In order to render the product sufficiently hydrophobic for the desired oil absorption, it is sufficient that it be loaded with only about 3 to 5% silane. In such instances it is expedient that the alkali of the product be fully neutralized by mixing vaporized mineral acids with the organic halo silanes. Gaseous HCl or $SO_3$ (the anhydride of $H_2SO_4$) can be used for this purpose and completion of the neutralization therewith rather than with the organic halo silane is less costly.

For special applications it can be abvantageous to convert the finely divided hydrophobized water glass powder into granules, for example, by spraying it with a latex emulsion in a granulating drum.

The following examples will serve to illustrate the invention.

EXAMPLE 1

Commercial water glass with a 25.5% $SiO_2$ content and a molar ratio of $Na_2O:SiO_2=1:3.3$ and a density of 1.31 was atomized with the aid of a pressure nozzle at a gauge pressure of 28–32 atmospheres in a drying tower. The drying air was supplied directly at a temperature of 470° C. and left the drying tower at 180–190° C. The spray dried product had an apparent bulk density of 60–70 g./liter and an average grain size of 250–350μ. The individual particles were thin walled hollow spheres which were open on one side.

500 g. of the spray dried product were placed in a 12 liter flask and treated with 20 g. of dimethyl dichlorosilane vapors while stirring and then treated for a further 30 minutes with gaseous HCl. After this period all alkali had been neutralized and the hollow spheres had become hydrophobic, that is, they no longer were wetted by water. In order to improve the hydrophobic properties, the thus treated product was subjected to a heat treatment at about 300° C. for about 30 minutes.

When sprayed on the surface of oil contaminated water the spray dried and hydrophobized water glass product spontaneously absorbed the oil with the formation of a sufficiently coherent blanket so that it could be easily removed from the water surface. The resulting oil containing mass after drying could be rapidly and quickly burned off to eliminate the organic impurities.

EXAMPLE 2

In order to prepare a granulated product, 300 g. of the spray dried and hydrophobized product of Example 1 were sprayed with 270 g. of a 22% by weight latex emulsion, for example, of Buna-Huls 220, in a granulating drum. After drying at 110° C. the individual granules formed were well cemented. After sieving through a 3 m./m. sieve the granulates had an apparent bulk density of 140 g./liter. The granulated products thus produced in use exhibited the same good oil absorption and removal properties as the product of Example 1 but in addition had the advantage that they were not as sensitive to being blown about by the wind. They in addition are less costly than the pure latex granulates previously employed as the latex only serves as a granulation assistant.

The quantity of latex emulsion which can be used in the production of such granulates can, for example, be between about 10 and 50 wt. percent, preferably, between about 15 and 25 wt. percent (based on the dry substance content) with reference to the spray dried hydrophobized water glass product.

We claim:
1. A method of producing a particulate hydrophobic product suitable for absorption of organic water immiscible liquids which comprises, in combination, spray drying an aqueous water glass solution to produce a particulate dried product in the form of hollow spheres with an apparent bulk density of 50 to 200 g./liter, treating said particulate dried product with from 2 to 20% by weight of a methyl chlorosilane in vapor form, the said dried product being exposed to said vapors while in a closed vessel and while being agitated so as to render said product hydrophobic and heating the hydrophobized product to about 150 to 550° C. for about 1 to 120 minutes.

2. The method of claim 1 wherein the methyl chlorosilane is dimethyl dichlorosilane.

3. The method of claim 1 in which the apparent bulk density of the particulate spray dried product is 60 to 100 g./liter.

4. The method of claim 1 in which the spray dried product is treated with 2 to 20 wt. percent of dimethyl dichlorosilane with reference to the spray dried product.

5. The method of claim 1 in which the spray dried product is contacted with 3–5% by weight of a methyl chlorosilane and with a sufficient amount of a vaporized mineral acid to effect substantially complete neutralization of the alkali contained in the product.

6. The method of claim 5 in which said mineral acid is HCl.

7. The method of claim 1 comprising in addition spraying said heat treated hydrophobized product with a latex emulsion under granulating conditions to form granules thereof.

8. A particulate hydrophobic product suitable for absorption of organic water immiscible liquids comprising the hydrophobized spray dried and heat treated water glass product produced according to the process of claim 1.

9. A method of absorbing oils from the surface of oil polluted bodies of water which comprises spreading the product of claim 8 on such surface.

References Cited

UNITED STATES PATENTS 2,614,135 10/1952 Hirschler _____ 210—36 XR
2,668,151 2/1954 Pedlow et al. _____ 252—428

FOREIGN PATENTS 1,248,197 8/1967 Germany.

PATRICK P. GARVIN, Primary Examiner

U.S. Cl. X.R.
252—428, 430